US008365217B2

(12) United States Patent
Legrand

(10) Patent No.: US 8,365,217 B2
(45) Date of Patent: Jan. 29, 2013

(54) METHOD FOR MANAGING ADVERTISING DETECTION IN AN ELECTRONIC APPARATUS, SUCH AS A DIGITAL TELEVISION DECODER

(75) Inventor: Mickaël Legrand, Rueil-Malmaison (FR)

(73) Assignee: Sagemcom Broadband SAS, Rueil-Malmaison (FR)

( * ) Notice: Subject to any disclaimer, the term of this patent is extended or adjusted under 35 U.S.C. 154(b) by 26 days.

(21) Appl. No.: 13/141,479

(22) PCT Filed: Dec. 23, 2009

(86) PCT No.: PCT/FR2009/052686
§ 371 (c)(1),
(2), (4) Date: Jul. 14, 2011

(87) PCT Pub. No.: WO2010/072986
PCT Pub. Date: Jul. 1, 2010

(65) Prior Publication Data
US 2011/0265114 A1   Oct. 27, 2011

(30) Foreign Application Priority Data

Dec. 23, 2008 (FR) .................................... 08 59005

(51) Int. Cl.
*H04N 7/25* (2006.01)
*H04N 7/16* (2011.01)
*H04N 21/431* (2011.01)

(52) U.S. Cl. ............................. 725/32; 725/22; 725/37

(58) Field of Classification Search ....................... None
See application file for complete search history.

(56) References Cited

U.S. PATENT DOCUMENTS
(Continued)

FOREIGN PATENT DOCUMENTS

| EP | 1 001 632 | 10/2004 |
| EP | 1 701 351 | 9/2006 |

(Continued)

OTHER PUBLICATIONS

International Search Report as issued for PCT/FR2009/052686.

(Continued)

*Primary Examiner* — Kristine Kincaid
*Assistant Examiner* — Oschta Montoya
(74) *Attorney, Agent, or Firm* — Pillsbury Winthrop Shaw Pittman, LLP

(57) ABSTRACT

A method for managing the detection of advertising sequences in a stream of information stored on a mass memory module of an electronic apparatus, the information stream corresponding to an extract of a television program, the information stream including a first set of information corresponding to a content to be rendered and a second set of information, corresponding to the advertising sequences, the information stream including at least one set of video information, and teletext type data, and subtitle data associated with the stream, the method including analyzing the video information for detecting a format transition in the images associated with the video information; optionally storing a first address information corresponding to the detected transition, and validating a first detection condition; analyzing the teletext type data for detecting an absence, and then a presence, of teletext subtitles associated with the video information, optionally storing a second address information corresponding to the detected, transition, and validating a second detection condition; analyzing the subtitle data associated with the stream for detecting an absence, then a presence of the subtitle data associated with the stream; optionally storing third address information corresponding to the detected transition, and validating a third detection condition; if the three detection conditions are validated, identifying the stored address information as transition sequences between the second set of information and the first set of information.

14 Claims, 1 Drawing Sheet

U.S. PATENT DOCUMENTS

| | | |
|---|---|---|
| 5,987,210 A | 11/1999 | Iggulden et al. |
| 7,269,330 B1 | 9/2007 | Iggulden |
| 2003/0014747 A1 | 1/2003 | Spehr |
| 2003/0123841 A1 | 7/2003 | Jeannin |
| 2003/0185541 A1 | 10/2003 | Green |
| 2003/0210887 A1 | 11/2003 | Engle et al. |
| 2006/0064716 A1 | 3/2006 | Sull et al. |
| 2006/0245724 A1 | 11/2006 | Hwang et al. |

FOREIGN PATENT DOCUMENTS

| | | |
|---|---|---|
| EP | 1 819 166 | 8/2007 |

OTHER PUBLICATIONS

"Digital Video Broadcasting (DVB); Specification for Service Information (SI) in DVB systems"; European Broadcasting Union; Union Européenne de Radio-Télévision EBU-UER; Final draft ETSI En 300 468; ETSI Standard European Telecommunications Standard Institute (ETSI), Sohia Antipolis Cedex, France, vol. BC, No. V1.9.1; Nov. 1, 2008, pp. 6, 72, 74.

"Information Technology—Generic Coding of Moving Pictures and Associated Audio Systems, Recommendation H.222.0, ISO/IEC 13818-1, Draft International Standard"; ISO/IEC, Nov. 13, 1994, pp. 44-46, 50-53, 105, and 128-129.

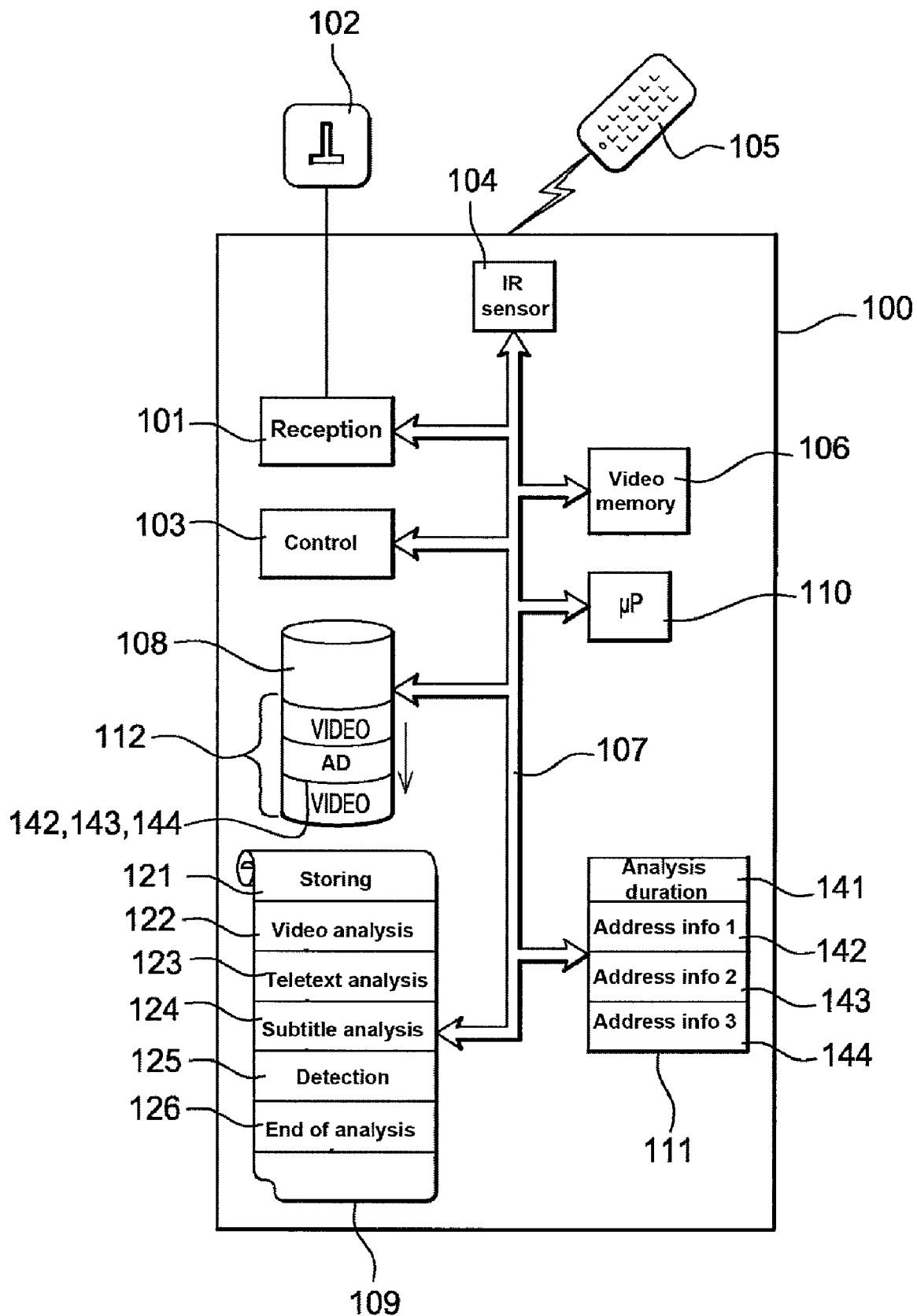

METHOD FOR MANAGING ADVERTISING DETECTION IN AN ELECTRONIC APPARATUS, SUCH AS A DIGITAL TELEVISION DECODER

CROSS REFERENCE TO RELATED APPLICATIONS

This application is the U.S. National Stage of PCT/FR2009/052686, filed Dec. 23, 2009, which in turn claims priority to French patent application Ser. No. 08/59005, filed Dec. 23, 2008, the entire contents of all applications are incorporated herein by reference in their entireties.

TECHNICAL FIELD OF THE INVENTION

The object of the present invention is a method for managing the detection of advertising slots in an electronic apparatus, for example a digital television decoder. The invention is particularly aimed at the automatic detection, by the considered electronic apparatus, of transitions between advertising sequences and programs other than advertising sequences (films, television series, documentaries or any other television programs not assimilated to what is usually considered as an advertising sequence) on contents stored on a hard drive of the electronic apparatus, the contents being from the recording of a television service on the considered hard drive. By service, is typically meant what users call a television channel, for example a channel broadcasting successive programs during the day.

The field of the invention is, generally, that of electronic apparatuses able to store video contents corresponding to television services. In the present description, reference will essentially be made to electronic apparatuses of digital television decoder type. However, other electronic apparatuses are concerned by the object of the invention, such as computers, hard drive type memory module reading devices . . . .

The invention will be more particularly described within the field of decoders receiving a stream of signals via the internet network, decoders which will be designated hereafter as IP decoders, however, the implementation of the method according to the invention is not limited to this type of decoders.

In the field of digital television, digital television decoders are used, particularly in order to access a set of television channels that are transmitted encrypted and are decrypted in the decoder. Television decoders are interface elements between systems for transmitting television signals, particularly digital television signals in MPEG and DVB format, and viewing monitors. Often, the monitor itself comprises circuits for decoding these television signals but this is not obligatory. The exchanged signals are mostly digital signals, but a decoder may also have the ability to process analog signals.

The transmission means which transmit television programs to these decoders/receptors are either typical aerial transmission means, or coaxial or even optical cables, or rebroadcast satellites which serve an area or even the internet network. The decoder comprises means for receiving the emitted signals and formatting means for transforming the received signals into signals directly applicable to the controlling elements of the viewing device. For a cathode ray tube, it is for example about the controls applied on the scanning elements and on the different electron guns generating color pixels on the screen.

Formatting is carried out by respecting for each image to be represented, parameter tables. Different types of tables may be distinguished: SI tables (System Information), PSI tables (Program Specific Information), NIT tables (Network Information Table), EIT tables (Event Information Tables), PAT tables (Program Association Table), CAT tables (Conditional Access Tables) or even PMT tables (Program Map tables) . . . .

In digital television, the parameter signals are to be transmitted in the stream (i.e., with the video signal itself) in data packets. The transmitted data packets are arranged into sections, the sections typically comprising 1024 bytes or, in some cases, 4096 bytes. Once they are received, the different packets are assigned to the appropriate tables. The packets of a same table are not necessarily grouped into a same section. They may be distributed in successive sections, interlaced with data packets pertaining to other tables or to video, audio or data signal or other. In each section, identifiers make it possible to assign the data packets to particular tables among other tables. On the reception side, a decoder does not know at first glance how data packets are distributed but can recognize a segmentation of the sections. Thus, the decoder must read the identifier in each section and reorganize the data in order to allocate them to the right tables. All parameter signals pertaining to the different tables are edited by the television operators or transport media managers, are incorporated in the stream of this operator, and routed to the users by different media.

Ultimately, an entire architecture of tables is thus distributed, particularly according to standard EN 300 468 and the purpose of the decoder is to reconstruct all the tables in order to have the setting information as well as information to be viewed by users.

In each stream of emitted multiplexed signals, whatever the physical support being used, a table called PAT, Program Association Table, is broadcast. This table which is a PSI table, defined in the ISO/IEC 13818-1 standard, lists the services available in the considered stream of multiplexed signals; itself thus gives the list of PMT tables, Program Map Table, (PSI table defined in the ISO/IEC 13818-1 standard), which are associated with each of the services, and which defines, for each service, the list of components associated with this service.

For each service, the PMT table contains in particular an information access control associated with this service. The access control CAT table makes it possible to collect this information and execute its transmission to a microprocessor of the decoder, the latter thus being able to determine whether the user of the decoder is entitled to this service. If this is the case, the microprocessor sends back an appropriate information enabling to obtain a digital key for decrypting the considered service. The latter may thus be rendered unscrambled on a viewing screen. An information associated with the PID (Program Identification Data), present in these tables, makes it possible to determine some properties of the images that are broadcast, and particularly to indicate the nature of the transferred information, for example audio, video, DVB subtitling . . . .

The MPEG2 standard makes it possible to multiplex several services in a same Transport Stream (TS) or channel. This standard is completed by the DVB standard which enables the service constitution and change, or zapping on several streams of multiplexed signals within a same and unique network.

TECHNOLOGICAL BACKGROUND OF THE INVENTION

Henceforth, many digital television decoders are equipped with a hard drive type memory unit, a large capacity memory enabling the storage of, for example, several cinema films. The storing duration henceforth reaches several dozen hours. Thus, an essential advantage of a digital television decoder equipped with a hard drive is that it makes it possible for the user to facilitate the recording of television programs and to watch them in a delayed-repeater mode; furthermore, the user has tools, particularly his/her remote-control which make it possible to set up a rapid navigation in the different programs he/she recorded on his/her hard drive, and in particular to rapidly run the advertising sequences which are inserted in the television program he/she recorded and is viewing on his/her screen.

Currently, the user has to search the end of the advertizing sequences by himself, using his/her remote control, and particularly the functions of fast forwarding and fast rewinding the contents stored on the hard drive. Such an action is time consuming, and is fastidious due to the many manipulations it requires to stop exactly at the end of the advertizing sequence.

GENERAL DESCRIPTION OF THE INVENTION

The method according to the invention provides a solution to the problems and drawbacks which have just been outlined. In the invention, a solution is proposed so that for a television program stored beforehand on the hard drive of a digital television decoder, the transitions between the advertizing sequences and other sequences be automatically detected by the considered decoder. To this end, it is proposed in the invention to proceed with different analyses of the signals and/or data stored on the hard drive, the signals and/or data corresponding to the viewed program, and to interpret variations of said signals as revealing of the presence of such transitions.

Thus, the invention substantially relates to a method for managing the detection of advertising sequences in a stream of information stored on a mass memory module of an electronic apparatus, said information stream corresponding to an extract of a television program, said information stream including a first set of information corresponding to a content to be rendered and a second set of information, corresponding to said advertizing sequences, said information stream including at least one set of video information, and teletext type data, and subtitle data associated with the stream, said method being characterized in that it comprises the different steps of:

analyzing the video information for detecting a format transition in the images associated with video information; optionally storing a first address information corresponding to the detected transition, and validating a first detection condition;

analyzing the teletext type data for detecting the absence, and then the presence, of teletext subtitles associated with said video information, optionally storing a second address information corresponding to the detected transition, and validating a second detection condition;

analyzing the subtitle data associated with the stream for detecting the absence, then the presence of said subtitle data associated with the stream; optionally storing third address information corresponding to the detected transition, and validating a third detection condition;

if the three detection conditions are validated, identifying the stored address information as transition sequences between the second set of information and the first set of information.

The method according to the invention may comprise, in addition to the main steps which have just been mentioned in the preceding paragraph, one or several additional characteristics among the following:

the stored address information corresponding to an actual transition sequence is that associated with a video image to be rendered first; by actual transition sequence, is meant a sequence which effectively corresponds to a transition sequence between an advertizing sequence and a sequence with a content other than an advertizing content;

the method comprises the additional step of pursuing a reading operation, that has already begun, of the considered information stream at the stored address information;

the format transition in the images associated with said video information is a transition from 4/3 type format to 16/9 type format;

the step of analyzing video information is carried out linearly or by dichotomy;

the step of analyzing teletext type data is carried out linearly;

the step of analyzing subtitle data associated with the stream is carried out linearly, or by dichotomy;

the method comprises the prior step of receiving an instruction from a user for triggering said method;

the information stream in which the detection of advertizing sequences is managed corresponds to a duration of video information determined beforehand, and in that, in the absence of validated detection conditions, it comprises the additional step of emitting a warning message.

the information stream in which the detection of advertizing sequences is managed starts at an image viewed by the user when said user issues the instruction for triggering said method;

the method according to the invention is implemented automatically.

the method of the invention is automatically implemented periodically.

The different additional characteristics of the method according to the invention, in so far as they are not mutually exclusive, are combined according to all the association possibilities in order to lead to different examples for carrying out the invention.

The present invention also relates to an electronic apparatus, advantageously a digital television decoder type electronic apparatus, able to carry out the method according to the invention, with its main characteristics, and possibly with one or several additional characteristics that have just been stated.

The invention and its different applications will be better understood upon reading the following description and examining the accompanying figures.

BRIEF DESCRIPTION OF THE FIGURE

The figure is shown for reference only and in no way for limiting the invention. The unique figure, FIG. 1, shows an example of a digital television decoder according to the invention, adapted to an example for carrying out the method according to the invention.

DESCRIPTION OF THE PREFERRED EMBODIMENTS OF THE INVENTION

In FIG. 1, a digital television decoder 100 is represented according to the invention. The decoder 100 comprises a module 101 for receiving television signals, which receives via an internet connection 102, possibly after processing by an intermediary box, a set of available streams. The reception means 101 may also be connected to a cable television network, an antenna or a satellite reception system. Moreover, the reception module 101 is connected to a circuit 103 for controlling the reception module 101. The control circuit 103 transmits to the reception module 101 a controlling signal indicating which service should be extracted from the set of available streams received via the Internet connection 102. The signals relating to the extracted service are digitized within the reception module 101.

A sensor 104, in this example, an infrared sensor, receives signals emitted by a remote control 105. An infrared cell of sensor 104 outputs a signal which allows the user to monitor the control circuit 103. In order to instantaneously render the extracted service, the digitized signals from the reception module 101 are sent in a video memory 106 via a bidirectional communication bus 107. A hard drive type memory module 108 is also connected to the bidirectional communication bus 107. Thus, when the decoder 100 is programmed or receives a command to record a given television service, the stream of information pertaining to this television service is stored in the hard drive. Generally, a hard drive is a large-capacity memory module, removable or not, the memory size of which can reach several hundreds of giga-bytes. Obviously, the method according to the invention may be carried out with a memory module of smaller size.

The bidirectional communication bus 107 carries control, address and/or data signals. It also makes it possible to ensure an exchange of information between the reception module 101; the control circuit 103 and the sensor 104, and
- a program memory 109, for managing the different operations which may intervene within the decoder 100, and particularly the different operations which may intervene for carrying out the method according to the invention; the program memory comprises a set of software applications which may be replaced by specific electronic circuits;
- a microprocessor 110, managing the set of exchanges between the different elements of the decoder 100; the user may directly trigger, using the remote control 105, the implementation of applications contained in the program memory 109;
- a data memory 111.

The operation of the digital television decoder 100 according to the invention is now explained.

Typically, a stream of information 112 received by the decoder 100 may be stored, by means of a particular application, called storing application 121, of the program memory 109, in the hard drive type memory module 108. The storage may be instantaneously triggered by the user or following a prior programming operation.

The stream of information 112 thus corresponds to a television program extract, with at least one set of video information, and possibly teletext type data, and/or DVB type subtitle data and more generally contained in the transport stream defined in standards MPEG 2/ISO/IEC 13818-1.

Furthermore, the stream of information 112 typically comprises two distinguishable sets of information: a first set of information called useful information, corresponding to contents that the user does wish to view, and a second set of information called added information, corresponding to advertizing sequences. The second set of information may sometimes be an empty set. The aim of the method according to the invention is to make it possible for the user to avoid viewing the second set of information. Thus, it is proposed, in the invention to perform an analysis of the stored stream of information 112 by carrying out different checks to detect a transition between information of the first set of information and information of the second set of information.

Thus, in the invention, the following analysis operations are proposed:
- a first analysis operation, carried out by means of a particular, so-called video information analyzing application 122, of the program memory 109. Advantageously, this application detects, in the stored stream of information 112, the passage from a 4/3 format, typically used for advertizing sequences, to a 16/9 format, typically used for some television programs or films. The information pertaining to the 4/3 or 16/9 format is present in headers of the data packets pertaining to the video information, and is thus directly accessible by said application.

The analysis of the video data may be carried out according to a first method or according to a second method. In the first method, called linear analysis method, the video information are browsed through, and more particularly, the data relating to the format of the considered video images, is read continuously, in the order in which the video data are to be rendered; thus, following a user instruction or automatically, as it will be explained later, it is started from a memory address of the hard drive 108, the memory address corresponding to the image during viewing, and the information pertaining to the image format is read for any following image to be rendered. The analysis ends when either the information pertaining to the image format reveals a 16/9 image format, or at the end of a certain number of analyzed images, corresponding to a rendering duration, determined beforehand, and called analysis duration 141, equivalent for example to seven minutes of images to be rendered, said information relating to the analysis duration being stored in a particular memory area, of the data memory 111. Typically, merely a few seconds are sufficient to analyze seven minutes of images to be rendered.

In the second method, called dichotomy analysis method, the first video image of 16/9 format is applied through dichotomy search, in the memory space of the hard drive to analyze, after a series of video images of 4/3 format. The dichotomy search is applied to a set of video data corresponding to images comprised between the image being viewed and a last analyzed image, for example the image offset from the current image by the analysis duration 141.

When a transition from a 4/3 image format to a 16/9 image format is detected, a first address information 142 is stored in a memory area of the data memory 111, said first address information referring to the video data of the first video image the format of which is the 16/9 type in the analyzed data.
- a second analysis operation, carried out by means of a particular, so-called teletext subtitle type data analysis application 123, of the program memory 109. Advantageously, this application detects, in the stream of stored information 112, the passage from video information where teletext subtitle type data are not present, as is the case in advertizing sequences, to video information where teletext subtitle type data are present, as is the case for films or certain television programs. The information relating to the return of teletext subtitle type data is obtained by analyzing the stream of the service, in which the presence, or absence, of teletext subtitles is detected. The analysis is thus advantageously achieved linearly on the set of data to analyze. When a transition marking the return of teletext type data information is detected, a second address information 143 is stored in a memory area of the data memory 111, said second address information referring to the video data of the first video image for which the teletext subtitle type data reappear.
- a third analysis operation, carried out by means of a particular, so-called DVB subtitle type data analyzing application 124, of the program memory 109. Advantageously, this application detects, in the stored stream of information 112, the passage from video information where there DVB subtitle type data is not present, as is the case for advertizing sequences to video information where DVB subtitle type data is present, as is the case for films or certain television programs. The information relating to the return of DVB subtitle type data is obtained by analyzing information associated with the previously mentioned PID. Thus, the analysis may be achieved linearly or by dichotomy on the set of data to be analyzed. When a transition marking the return of DVB subtitle type data type information is detected, a third address information 144 is stored in a memory area of the data memory 111, said third address information referring to the video data of the first video image for which the DVB subtitle type data reappear.

A particular, so-called advertizing sequence end detecting application 125, of the program memory 109, makes it possible to interpret the results of the different analyses that have just been mentioned. In a first implementation mode, if either the first address information 142, or the second address information 143 or the third address information 144 is stored, the application for detecting the end of advertizing sequences detects the end of an advertizing sequence at the stored address. If several addresses are stored, the address marking the end of the advertizing sequence is considered as being that associated with a video image to be viewed first during the rendering operation.

In another mode for carrying out the method according to the invention, at least two addresses must have been stored for the advertizing sequence end application to determine the transition between a non advertizing sequence and an advertizing sequence. In such a case, the address marking the end of the advertizing sequence is considered as being that associated with a video image to be viewed first during the rendering operation.

In practice, the implementation of the method according to the invention may be made as follows: a user views a stream of information stored on the hard drive 108 of his/her electronic apparatus, for example the decoder 100. When an advertizing sequence begins and he/she does not wish to view this function, he/she triggers the implementation of the method according to the invention for example by pressing a button of the remote control 105. The different analysis operations previously mentioned are thus executed. If these analysis operations lead to the storage of one of the previously mentioned address information, then the reading of the stream of information is resumed at the stored address, and retained by the advertizing sequence end application.

If the analysis operations do not lead to any storage of one of the address information which have just been mentioned, a particular, so-called analysis end application 126, warns the user that the end of the advertizing sequence was not able to be detected, for example by displaying an appropriate message 144, stored in the data memory 111, on the viewing screen, and the reading of the stream of information is pursued where the user had wanted to interrupt it.

In another possible embodiment, the method according to the invention is carried out automatically, for example periodically, for example every five minutes. Thus, to be carried out automatically, the analysis operations are executed to determine whether the image being viewed corresponds to an advertizing sequence. If this is the case, the method such as previously described is pursued. Otherwise, the reading of the information stream continues normally.

The decoder according to the invention notably comprises means for carrying out the method according to the invention, and in particular the program memory 109 with the different applications that have just been mentioned.

The invention claimed is:

1. A method for managing the detection of advertising sequences in a stream of information stored on a mass memory module of an electronic apparatus, said information stream corresponding to an extract of a television program, said information stream including a first set of information corresponding to a content to be rendered and a second set of information, corresponding to said advertising sequences, said information stream including at least one set of video information, and teletext type data, and subtitle data associated with the stream, said method comprising:

analyzing the video information for detecting a format transition in the images associated with the video information; storing a first address information corresponding to the detected transition, and validating a first detection condition;

analyzing the teletext type data for detecting a transition corresponding to an absence, and then a presence, of teletext subtitles associated with said video information, storing a second address information corresponding to the detected transition, and validating a second detection condition;

analyzing the subtitle data associated with the stream for detecting a transition corresponding to an absence, then a presence of said subtitle data associated with the stream; storing third address information corresponding to the detected transition, and validating a third detection condition;

if the three detection conditions are validated, identifying the stored address information as transition sequences between the second set of information and the first set of information.

2. The method according to claim 1, wherein the stored address information corresponding to an actual transition sequence is that associated with a video image to be rendered first.

3. The method according to claim 1, comprising pursuing an operation started beforehand, of reading the considered stream of information at the stored address information.

4. The method according to claim 1, wherein the format transition in the images associated with said video information is a transition from a 4/3 type format to a 16/9 type format.

5. The method according to claim 1, wherein analyzing the video information is carried out linearly or by dichotomy.

6. The method according to claim 1, wherein analyzing the teletext type data is carried out linearly.

7. The method according to claim 1, wherein analyzing subtitle data associated with the stream is carried out linearly, or by dichotomy.

8. The method according to claim 1, comprising receiving an instruction from a user for triggering said method prior to analyzing the video information.

9. The method according to claim 8, wherein the information stream in which the detection of advertising sequences is managed corresponds to a video information duration, determined beforehand, and wherein, in the absence of validated detection conditions, the method comprises issuing a warning message.

10. The method according to claim 9, wherein the information stream in which the detection of advertising sequences is managed starts at an image viewed by the user when said user issues the instruction for triggering said method.

11. The method according to claim 1, wherein said method is implemented automatically.

12. The method according to claim 11, wherein the automatic implementation is periodic.

13. An electronic apparatus capable of implementing the method according to claim 1.

14. The electronic apparatus according to claim 13, wherein said apparatus is a digital television decoder type electronic apparatus.

* * * * *